(12) United States Patent
Jackson (10) Patent No.: US 6,478,879 B1
(45) Date of Patent: Nov. 12, 2002

(54) SYSTEM AND METHOD FOR CARBON DIOXIDE CLEANING OF DATA STORAGE TAPE

(75) Inventor: Robert S. Jackson, Little Canada, MN (US)

(73) Assignee: Imation Corp., Oakdale, MN (US)

( * ) Notice: Subject to any disclaimer, the term of this patent is extended or adjusted under 35 U.S.C. 154(b) by 33 days.

(21) Appl. No.: 09/660,575

(22) Filed: Sep. 13, 2000

(51) Int. Cl.[7] .............................. B08B 1/02; B08B 5/00; B24C 1/00; B24C 3/08
(52) U.S. Cl. .................... 134/7; 134/6; 134/9; 134/15; 134/19; 134/21; 134/37; 451/39; 451/53
(58) Field of Search ................... 134/6, 7, 2, 9, 134/15, 19, 21, 37, 42, 902; 451/38, 39, 53

(56) References Cited

U.S. PATENT DOCUMENTS

| | | |
|---|---|---|
| 5,362,941 A | 11/1994 | Johnson et al. |
| 5,364,474 A | 11/1994 | Williford, Jr. |
| 5,419,733 A | 5/1995 | Johnson et al. |
| 5,859,755 A * | 1/1999 | Griffin et al. ............... 360/128 |
| 6,120,357 A | 9/2000 | Jackson et al. |

FOREIGN PATENT DOCUMENTS

GB      2239731     * 10/1991

OTHER PUBLICATIONS

Williford, "Experiment on Spin–Cleaning of Patterned Silicon Wafer Using $CO_2$ Snow," Sep. 1995.

* cited by examiner

Primary Examiner—Zeinab El-Arini
(74) Attorney, Agent, or Firm—Eric D. Levinson (57) ABSTRACT

Systems and methods for prevention of condensation of ambient water vapor due to evaporation of frozen carbon dioxide particles used to clean data storage tapes. Various embodiments maintain conditions under which condensation cannot form in the ambient environment immediately surrounding a portion of a rigid surface on which the tape is maintained in thermodynamic contact and under tension (e.g., a metallic capstan around which the tape is wrapped).

36 Claims, 6 Drawing Sheets

SYSTEM AND METHOD FOR CARBON DIOXIDE CLEANING OF DATA STORAGE TAPE

FIELD OF THE INVENTION

This invention concerns carbon dioxide cleaning systems for data storage tape.

BACKGROUND OF THE INVENTION

Lasers and similar sources of energy may be used to write tracks into the surface of magnetic data storage tape. Such writing techniques can generate debris that may adversely affect the product if not removed before, during, and after other manufacturing processes. Debris may also adversely affect the equipment in which the tapes are subsequently used. Various methods for cleaning magnetic data storage tapes are known, including fabrics which physically contact the tape surface and burnishing techniques.

SUMMARY OF THE INVENTION

The invention provides systems and methods of thermal control in the carbon dioxide cleaning of data storage tapes to reduce or prevent condensation on the surface of the media during the cleaning process.

One aspect of the invention is a system for reducing condensation on data storage tape during carbon dioxide cleaning. The system comprises at least one rigid surface on which the tape is supported under tension over a contact distance (e.g., a capstan). A carbon dioxide delivery system comprises one nozzle per rigid surface. Each nozzle is directed to strike the tape at an impingement point within the contact distance of its respective rigid surface. A heating system maintains the surface temperature of the tape, as measured near each impingement point, above ambient dew point.

Another aspect of the invention is a method of reducing condensation on data storage tape during carbon dioxide cleaning. This method comprises supporting the tape under tension over a contact distance on at least one rigid surface (e.g., over the wrapping angle of a capstan). Carbon dioxide is directed through at least one nozzle per rigid surface at an impingement point within the contact distance of that rigid surface. By maintaining surface temperature of the tape, as measured near each impingement point, above ambient dew point, condensation is reduced.

BRIEF DESCRIPTION OF THE DRAWINGS

The accompanying drawings show a particular embodiment of the invention as an example, and are not intended to limit the scope of the invention.

DETAILED DESCRIPTION

It is particularly desirable to clean magnetic data storage recording tapes during manufacture. Systems using frozen carbon dioxide particles to dislodge and displace debris have been used to clean other forms of magnetic media, but those methods were not applicable to tape media prior to this invention.

The primary reasons is that the traditional solutions to the basic disadvantages of using conventional carbon dioxide cleaning systems on any form of media are not immediately applicable to processes for manufacturing data storage tape. The primary problem with carbon dioxide systems is that the temperature of the media surface will be lowered by the evaporation of the frozen carbon dioxide particles. If the media surface temperature falls below the dew point of the air in which the media is located, moisture (liquid water or vapor) can condense on the media surface and, in some instances, frost (frozen water) can also condense on the surface. Either form of condensation may severely impact the success of the cleaning processes.

To reduce the likelihood of condensation on the media surface, a variety of techniques have been employed. One solution is to increase the cycle time of the manufacturing equipment to allow the surface temperature of the media to rise. For example, a system for cleaning rotating circular magnetic diskettes can operate with any short burst of carbon dioxide particles, each such burst being too short to cause significant cooling, with the time between bursts being long enough to ensure that the media surface can return to acceptable levels prior to the next burst. Because the media is mounted in a rotating spindle, the entire media surface is accessible within a very short time when the next burst of cleaning is indicated.

However, because the surface area of an individual diskette is very small compared to that of a continuously moving tape product, the carbon dioxide cleaning system does not need to be active for a long continuous time to cover the entire surface area of a diskette. Thus, this approach is not applicable to a tape product, because the linear nature of the tape means that only a very short portion of the media surface is available at any given time. The additional cycle time required for batch-type cycling of equipment would not be tolerable in the essentially continuous processes used to manufacture data recording tape.

Another approach is to lower the dew point of the ambient cleaning environment, either by drying the air in which the media is located, or purging the environment with a dry inert gas such as nitrogen. This approach does, however, add additional cost to the cleaning process. Also, maintaining a closed or semi-sealed environment is difficult or impossible in a high-volume production process, because many pars must continuously enter and exit the cleaning system.

The invention described below solves these problems.

Figure 1:
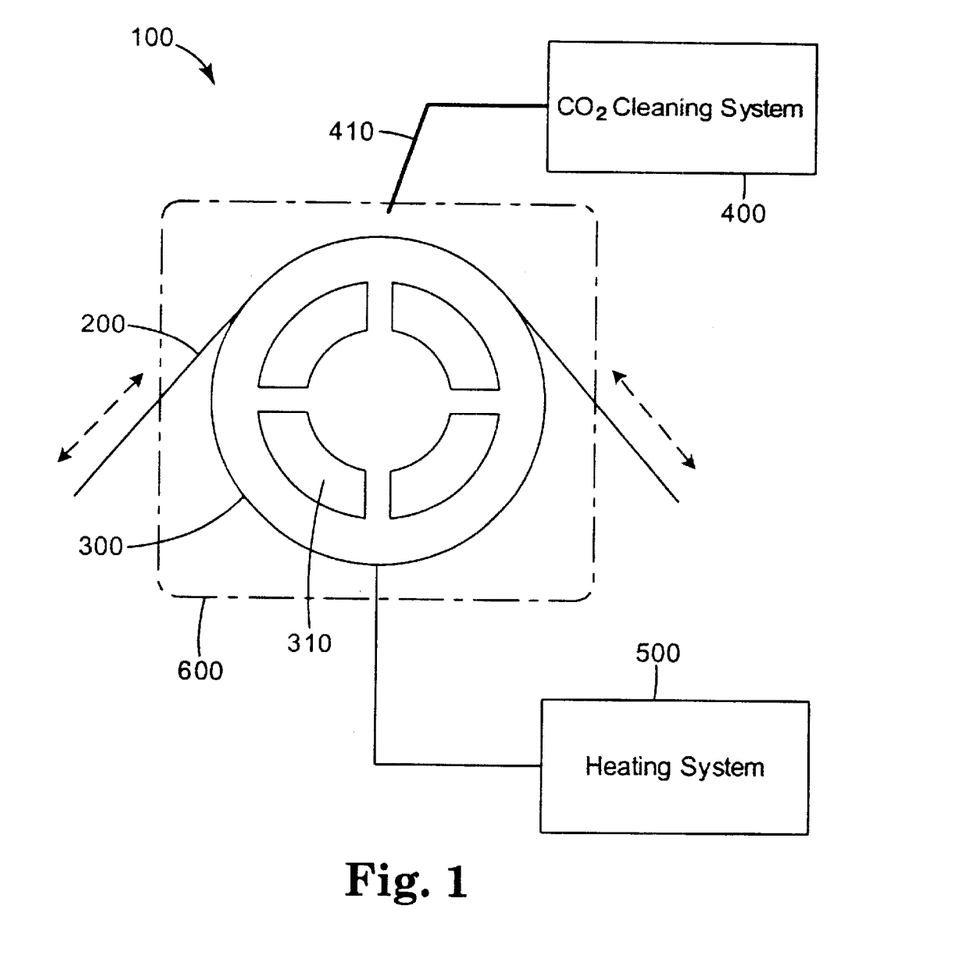
FIG. 1 is schematic view of one embodiment of a data storage tape cleaning system according to the invention.

FIG. 1 is a schematic view of a data storage tape cleaning system 100. System 100 employs a stream of frozen carbon dioxide particles to dislodge debris particles from the surface of the data storage tape.

Data storage tape 200 is supported under tension by a rigid surface of arbitrary design. In the preferred embodiment of FIG. 1, tape 200 is wrapped around a capstan 300 as it moves in either direction as indicated by the dashed double-headed arrows. This is only a preferred embodiment, as any rigid surface is within the scope of the invention, whether rotating (i.e., having the same linear velocity as that of the tape) or stationary (e.g., a platen).

Cleaning system 100 further comprises carbondioxide delivery system 400 and heating system 500. In the particular embodiment shown in FIG. 1, system 100 further comprises optional environmental chamber 600, but it is not critical to the scope of the invention for it to be present, as explained below.

Cleaning system 400 emits a jet of pressurized carbon dioxide gas, and frozen carbon dioxide particles which are formed as the gas rapidly expands to atmospheric pressure, from nozzle 410 to clean tape 200. Nozzle 410 is illustrated schematically as a single unit but this is representative of multi-unit assemblies as will be discussed in more detail below.

The jet of carbon dioxide gas and frozen carbon dioxide particles strikes tape 200 at an impingement point within the area of the rigid surface known as the contact distance, i.e., the portion of the rigid surface over which tape 200 is under tension and in direct contact with the surface. In the preferred embodiment in which the rigid surface is capstan 300, the contact distance is known as the wrapping angle, i.e., the portion of the circumference of capstan 300 over which tape 200 is under tension and in direct contact with the capstan.

The jet of gas and frozen carbon dioxide particles removes debris off of the front surface of tape 200 but evaporates or sublimates and dissipates into the ambient environment without leaving any residue on tape 200. The evaporation or sublimation of the carbon dioxide cools the front surface of tape 200.

With respect to surfaces of tape 200, "front" and "back" respectively refer to the surface having and not having debris. While creating of an optical servo pattern using laser energy is a common cause of debris, debris may be present on either or both sides of the tape before a servo pattern is even created. Airborne contaminants are always a potential problem in manufacturing operations. Similarly, debris may be caused by the process of slitting a wider web of tape into individually sized widths of tape prior to the servowriting process. Such debris can cause the tape to have tent-like distortions in the vicinity of the debris particle. In cases such as these, the invention is suitable for a "pre-cleaning" application, i.e., one which takes place prior to another process which would be adversely affected if debris were present on either side of the tape (even if that process primarily affects the side of the tape opposite the debris).

As for the servowritten side, large debris particles already present on the tape can interfere with the servowriting process; for example, a debris particle could distort a laser beam used in some servowriting processes. Similarly, debris will adversely affect the electromagnetic and durability performance of tape 200. Depending on the manufacture of the tape, either or both of the servowritten portion and the magnetically active portion of the tape could be either the front or the back side. For example, the servo pattern may be responsible for the debris but may or may not be created in the same portion of the tape as that portion which actually records the data.

In any event, use of carbon dioxide to clean debris from the front surface of the tape can form a microscopic layer of condensed water vapor on tape 200, and this layer can counteract the cleaning effect of cleaning system 400. Therefore, the invention includes either or both of two additional subsystems.

The first subsystem encloses the environment in the immediate vicinity of the impingement point, as illustrated schematically by sealed environmental chamber 600. This permits the ambient environment within chamber 600 to be purged of moisture-containing air and replaced (in whole or in part) with a dry gas such as nitrogen. (The details of the purging and dry gas systems are conventional and therefore not illustrated in FIG. 1.) This approach can maintain the relative humidity within the chamber below 30–40% and reduce the formation of water vapor.

The second is to employ heating system 500 to transfer heat to capstan 300 to maintain the surface temperature of tape 200 (at and around the point of impingement of the carbon dioxide) above the dew point of the ambient environment, thus preventing condensation of the ambient water vapor.

But, as noted above, creation and maintenance of a sealed environmental chamber 600 is difficult and costly, especially when compared to the use of heating system 500 in an open environment. Therefore, the preferred embodiment of the invention does not employ environmental chamber 600 at all. However, it is within the scope of the invention to use environmental chamber 600 and heating system 500 together. This provides the flexibility to design environmental chamber 600 to less stringent performance standards than would be required if the heating system 500 were not present at all, or to design heating system 500 to less stringent performance standards then would be required if environmental system 600 were not present at all.

Whether environmental chamber 600 is used or not, capstan 300 and heating system 500 are thermodynamically engineered to compensate for the changes in temperature, humidity and other environmental variables that tape 200 experiences when the carbondioxide evaporates after striking tape 200.

If tape 200 has any slack in it, the impact energy of the carbon dioxide particles will be dampened, and therefore they will lose cleaning effectiveness, by momentum transfer to the tape. Therefore, tape 200 is supported and held under tension on the rigid surface over at least the extent of the contact distance. Depending on the configuration of the contact surface, this can be accomplished by any technique known in the art. In the preferred embodiment of capstan 300, the conditions and features of the system that control the wrap angle and the tension of the tape are well-known, therefore they do not affect the scope of the invention and are not shown in FIG. 1. In accordance with those known principles, wrap angle, tension, and other related variables should be adjusted to provide intimate physical contact, under tension, between tape 200 and capstan 300 so that the thermal conductivity between them is adequate for heating system 500 to function as designed.

The material of capstan 300 must have a large amount of thermal mass (which requires both a large value of mass and a high specific heat value), yet a large value of thermal conductivity sot hat adequate heat transfer to tape 200 will occur. The relevant parameter to combine the requirements for a large thermal mass is specific heat per unit volume (as opposed to per unit mass), which should be as large as possible given other design constraints on the system. Taking all issued (including cost) into account, the preferred material for capstan 300 is copper, but any of the materials in the following table (including alloys comprising any of the materials) are within scope of the invention:

TABLE 1

| Material | Thermal Conductivity BTU/ (hr-ft²-° F./ft) | Specific Heat BTU/ (lb-° F.) | Density Lb/ft³ | Specific Heat/Volume BTU/(ft³-° F.) |
| --- | --- | --- | --- | --- |
| Nickel | 53 | 0.11 | 556 | 61.2 |
| Iron | 44 | 0.11 | 491 | 53.0 |

TABLE 1-continued

| Material | Thermal Conductivity BTU/ (hr-ft²-° F./ft) | Specific Heat BTU/ (lb-° F.) | Density Lb/ft³ | Specific Heat/Volume BTU/(ft³-° F.) |
|---|---|---|---|---|
| Copper | 227 | 0.09 | 560 | 51.5 |
| Beryllium | 90 | 0.45 | 114 | 51.3 |
| Chromium | 39 | 0.11 | 449 | 49.4 |
| Steel | 27 | 0.10 | 487 | 48.7 |
| Zinc | 65 | 0.09 | 446 | 41.0 |
| Aluminum | 100 | 0.23 | 169 | 38.9 |
| Silver | 242 | 0.06 | 655 | 36.7 |
| Magnesium | 92 | 0.25 | 109 | 27.3 |

For data storage tape of approximately 12–25 mm in width (the dimension perpendicular to the plane of FIG. 1), capstan 300 may be approximately 75–100 mm in diameter, with the larger diameter being preferred if other design considerations permit. A copper capstan of these dimensions, maintained at a temperature of approximately 130° Fahrenheit (54.5° Celsius), is adequate to prevent formation of water vapor on tape 200.

Heating system 500 may be thermodynamically connected to capstan 300 and/or tape 200 in any convenient manner. For example, electroresistive or convective heaters (not shown) could be connected to capstan 300, or radiative heating such as from an infrared (IR) lamp or other source could be used. Alternatively, any convective heating technique, such as heat transfer fins, or any mechanism that causes heated air to flow to the capstan, are also suitable. The preferred approach is to employ a conventional squirrel cage fan to propel heated air into hollow regions 310 within capstan 300. Using known design principles, heating system 500 can be designed to deliver air at approximately 150° Fahrenheit (65.5° Celsius) and maintain a capstan 300 of the dimensions specified above at the preferred temperature of 130° Fahrenheit (54.4° Celsius). The shape and size of hollow regions 310 is not critical to the scope of the invention and therefore illustrated only schematically in FIG. 1.

Figure 2:
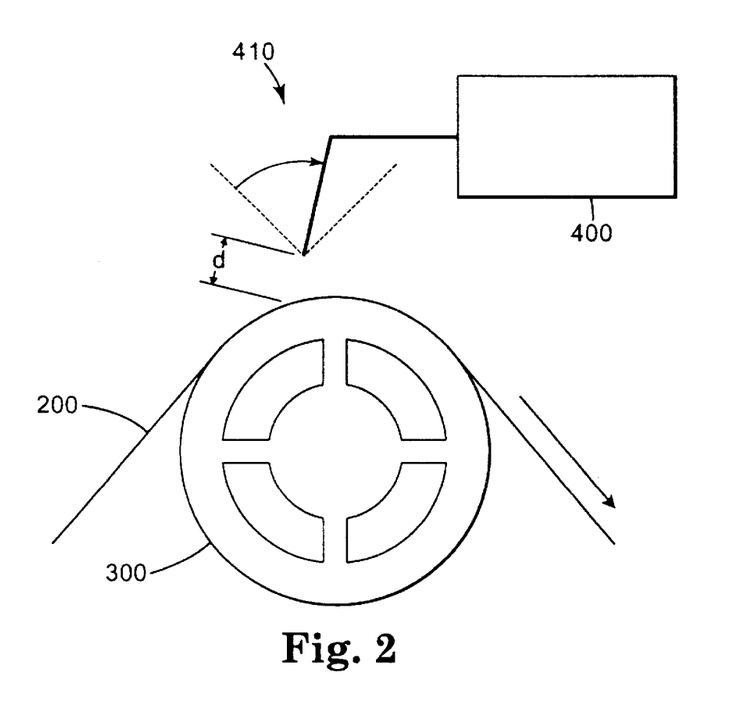
FIG. 2 is a schematic view of geometrical values relevant to the invention.

FIG. 2 schematically illustrates the geometry of carbon dioxide nozzle 410. In general, nozzle 410 may be pointed at tape 200 at any angle, such as the "forward" angle illustrated. This forward angle increases the velocity relative to at which the carbon dioxide particles strike tape 200 when the tape is moving in the direction indicated by the arrow. It is possible to use a reverse angle and/or reverse the direction of the tape. The choice is determined by design considerations that depend on the number and size of the particles that must be cleaned from the tape; these in turn depend on the composition of the tape and the details of the servowritten pattern on the tape, and the invention is not limited in any manner by such factors. The distance between nozzle 410 and tape 200 ranges from 1.27 mm (0.05 inch) to 19.05 mm (0.75 inch), with 2.54 mm (0.1 inches) being a preferred value.

Figure 3A:
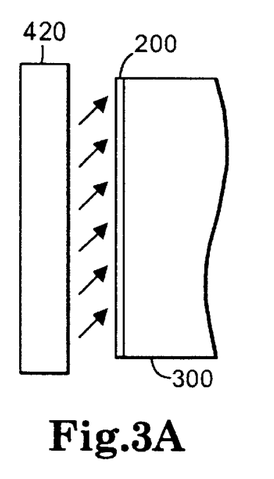
FIGS. 3A, 3B and 3C are side views of alternative embodiments of the invention.
Figure 3B:
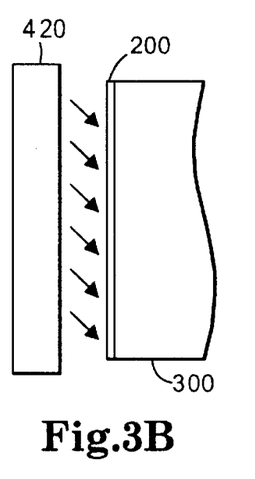
Figure 3C:
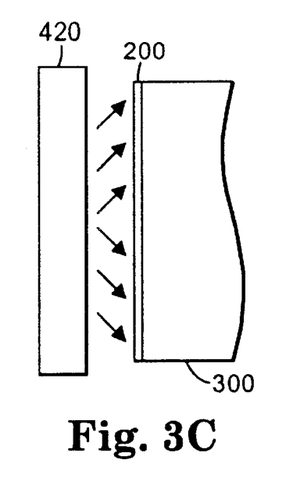

FIGS. 3A, 3B and 3C schematically illustrate that the angle at which the carbon dioxide is directed toward tape 200 also can vary across the width of tape 200. The most preferred embodiment is shown in FIG. 3C, because it tends to direct debris entirely off the tape surface instead of moving it from the bottom of the tape to the top and vice versa. This embodiment requires either a split-direction nozzle or, more easily, a plurality of nozzles.

Figure 4:
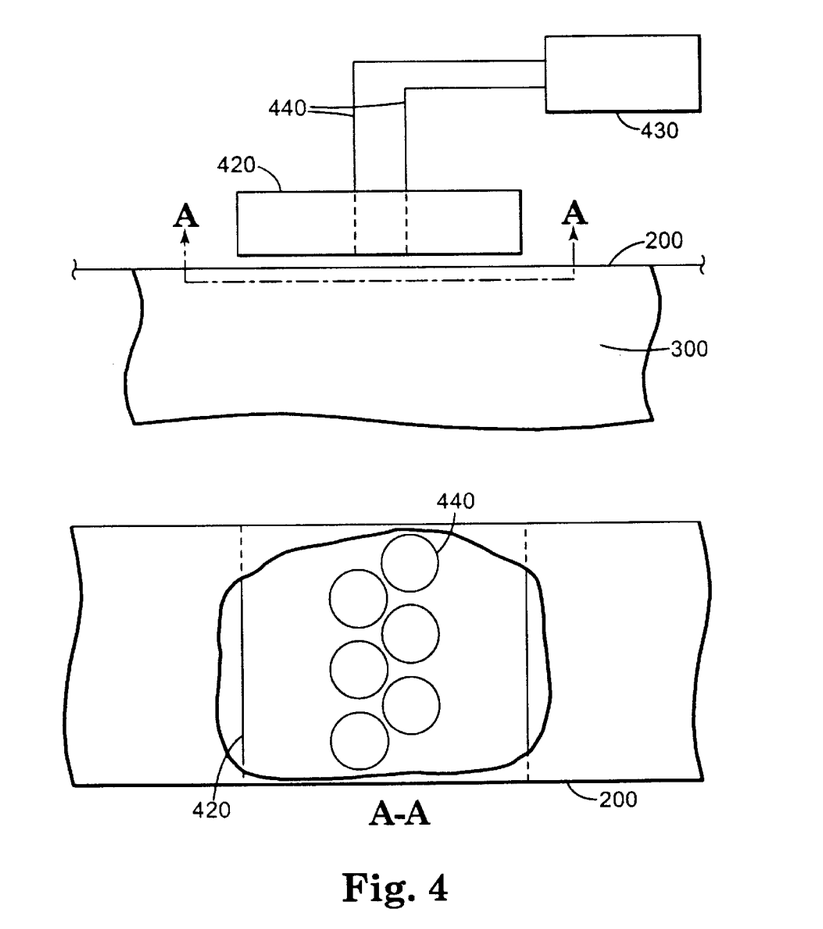
FIG. 4 is a top and cross sectional view, taken along lines A—A, of an other embodiment of the invention, wit a portion of the cross sectional view cut away.

FIG. 4 illustrates a preferred embodiment employing a plurality of nozzles. A manifold 420 holds the plurality of nozzles in position. A multiple nozzle gun 430 (available from Va-Tran Systems of Chula Vista, Calif., USA), having six flexible nozzles 440, may be used in the arrangement of FIG. 2. This embodiment is particularly preferred when magnetic recording tape 200 is wider than the diameter of any individual nozzle. An example would be 12.7 mm (0.5 inch) wide tape and nozzles having an effective spray pattern of 3.175 mm (0.125 inch), which is possible with a nozzle having an inner diameter of 0.51 mm (0.020 inch) and outer diameter of 1.57 mm (0.062 inch), but the invention is not limited to these values.

Figure 5:
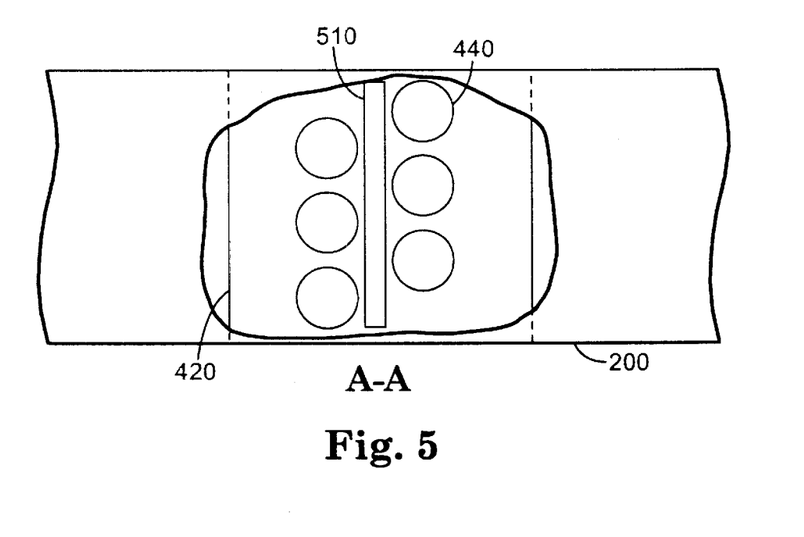
FIGS. 5–7 are schematic views of other embodiments of data storage tape cleaning systems according to the invention.

A variation on this embodiment provides a source of heat in the immediate vicinity of manifold 420. This permits control over the temperature in the vicinity of the nozzles 410 by directly heating them, such as by using a resistively heated manifold 420. A variation on this embodiment is shown in FIG. 5. An outlet 510 directs warm air onto tape 200 in the immediate vicinity of manifold 420. Arranging outlet 510 adjacent nozzles 440 permits fine control of the surface temperature of tape 200 by directing heated air against it. This option provides greater control and flexibility over the entire process of heating tape 200. For example, a temperature sensor (not shown) could monitor the temperature of tape 200 (before or after the impingement point, or both). Because of the finite lead time associated with heating capstan 300, the heated air could adapt to a need for additional heating faster than heating system 500. The source of heated air could be heating system 500 or a separate sub-system dedicated to outlet 510. It is also possible to provide a source of heated air that is not incorporated into manifold 420 so that tape 200 may be heated immediately prior to or just after the impingement point. Outlet 510 could be arranged in any number of configurations, such as is indicated schematically in FIG. 5, or in any number of other configurations, including coaxially surrounding the nozzles.

Figure 6:
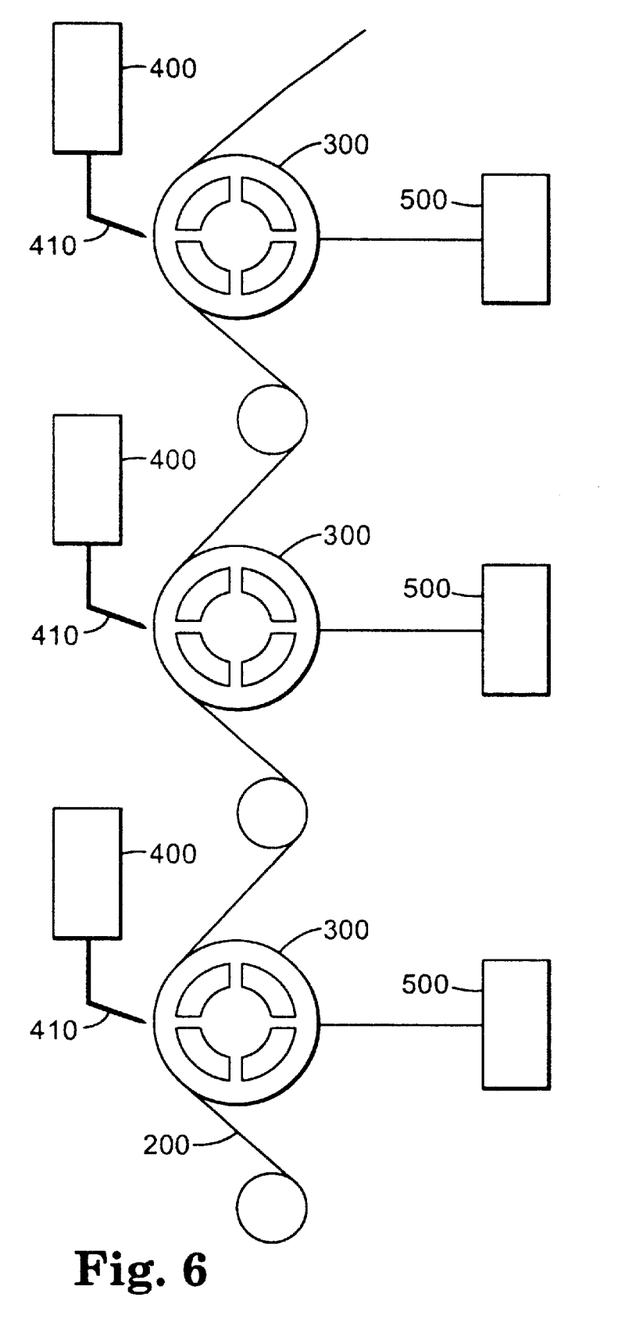

Additional cleaning efficiency is possible using multiple cleaning systems, each of the general type illustrated in FIG. 1. For example, FIG. 6 illustrates an embodiment in which three capstans 300 are used with tape 200. This arrangement permits operating any individual carbon dioxide cleaning system non-continuously, while still providing continuous cleaning of the tape from the combined operation of the multiple systems. This allows one or two of the three carbon dioxide cleaning systems 400 to be recovering from "over-frost" conditions or other interruptions of service, while still leaving one or two systems operational. In the embodiment shown in FIG. 6, individual heating systems 500 are shown, and this is preferred because it allows each such system to accommodate the needs of the individual capstan 300 to which it is thermodynamically connected. However, this is only an example and not critical to the scope of this embodiment. In some circumstances, it may be more efficient to have a common heating system 500 and direct varying amounts of heat to the individual capstans using individually controlled delivery mechanisms. An example would be zone controlled ductwork directing individual amounts of heated air from a central source.

Figure 7:
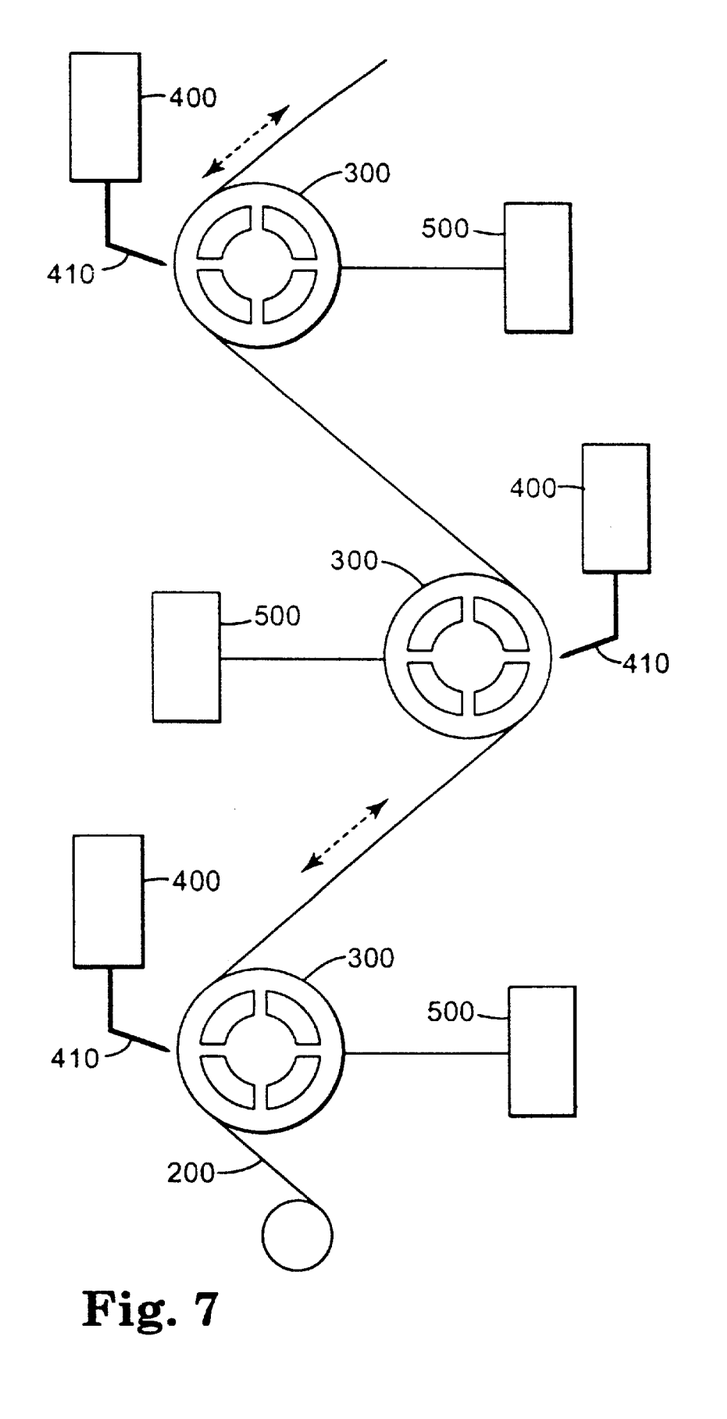

FIG. 7 is similar to FIG. 6 but illustrates a system in which both sides of the tape are cleaned by multiple carbon dioxide systems as described above.

In any of the embodiments described above, a vacuum sub-system could additionally be provided to remove debris (including extraneous carbon dioxide particles) from the vicinity of the impingement point. Generally, this involves enclosing the entire area adjacent the capstan, along the lines of optional environmental chamber 600 as described above.

In those embodiments in which optional environmental chamber 600 is present, the vacuum sub-system could be incorporated into the environmental chamber, e.g., they could share a common enclosure, but this is not a requirement of the invention.

I claim:

1. A system for reducing condensation on data storage tape during carbon dioxide cleaning, comprising:
   a) at least one rigid surface in which the tape is supported under tension over a contact distance;
   b) a carbon dioxide delivery system, comprising at least one nozzle per rigid surface, each nozzle directed to strike the tape at an impingement point within the contact distance of its respective rigid surface;
   c) a heating system to maintain surface temperature of the tape, as measured near each impingement point, above ambient dew point.

2. The system of claim 1, in which the rigid surface comprises a material chosen from the group consisting essentially of nickel, iron, copper, beryllium, chromium, steel, zinc, aluminum, silver, magnesium, and their alloys.

3. The system of claim 1, in which the rigid surface is a capstan, and the contact distance is a wrapping angle.

4. The system of claim 1, further comprising at least one environmental chamber separating the rigid surface and its respective nozzle from their ambient conditions.

5. The system of claim 4, further comprising means for maintaining relative humidity within the environmental chamber below 40%.

6. The system of claim 4, further comprising a moisture purging subsystem to replace at least some air within the environmental chamber with a dry gas.

7. The system of claim 6, in which the dry gas is nitrogen.

8. The system of claim 1, in which the heating system comprises an electroresistive heater connected to the rigid surface.

9. The system of claim 1, in which the heating system comprises a convective heater connected to the rigid surface.

10. The system of claim 1, in which the heating system causes air to flow to the rigid surface.

11. The system of claim 1, in which the nozzle is directed toward the rigid surface at a forward angle with respect to tape direction.

12. The system of claim 1, in which the nozzle is spaced from the tape by a distance greater than 1.27 mm and less than 19.05 mm.

13. The system of claim 1, further comprising a manifold in which a plurality of the nozzles is located.

14. The system of claim 13, in which the manifold is heated.

15. The system of claim 1, further comprising a subsystem to direct heated air onto the tape immediately adjacent the impingement point.

16. The system of claim 15, further comprising a manifold in which there is a plurality of nozzles, and in which the manifold comprises an outlet for directing the heated air onto the tape.

17. The system of claim 1, further comprising at least one vacuum subsystem to remove debris from a vicinity of at least one impingement point.

18. The system of claim 1, in which the system is one of a plurality of multiple carbon dioxide cleaning systems, any of which operates non-continuously while still providing continuous cleaning of the tape from a combined operation of the multiple systems.

19. A method of reducing condensation on data storage tape during carbon dioxide cleaning, comprising:
   a) supporting the tape under tension over a contact distance on at least one rigid surface;
   b) directing carbon dioxide, through at least one nozzle per rigid surface, at an impingement point within the contact distance of that rigid surface;
   c) maintaining surface temperature of the tape, as measured near each impingement point, above ambient dew point.

20. The method of claim 19, in which the rigid surface comprises a material chosen from the group consisting essentially of nickel, iron, copper, beryllium, chromium, steel, zinc, aluminum, silver, magnesium, and their alloys.

21. The method of claim 19, in which the rigid surface is a capstan and the contact distance is a wrapping angle.

22. The method of claim 19, further comprising separating the rigid surface and its respective nozzle from their ambient conditions by an environmental chamber.

23. The method of claim 22, further comprising maintaining relative humidity within the environmental chamber below 40%.

24. The method of claim 22, further comprising replacing at least some air within the environmental chamber with a dry gas.

25. The method of claim 24, in which the dry gas is nitrogen.

26. The method of claim 19, in which maintaining the surface temperature of the tape comprises electroresistively heating the rigid surface.

27. The method of claim 19, in which maintaining the surface temperature of the tape comprises convectively heating the rigid surface.

28. The method of claim 19, in which maintaining the surface temperature of the tape comprises causing air to flow to the rigid surface.

29. The method of claim 19, in which directing the carbon dioxide at the impingement point comprises directing the nozzle at a forward angle with respect to tape direction.

30. The method of claim 19, in which directing the carbon dioxide at the impingement point comprises spacing the nozzle from the tape by a distance greater than 1.27 mm and less than 19.05 mm.

31. The method of claim 19, further comprising locating a plurality of the nozzles in a manifold.

32. The method of claim 31, further comprising heating the manifold.

33. The method of claim 19, further comprising directing heated air onto the tape immediately adjacent the impingement point.

34. The method of claim 33, further comprising locating a plurality of the nozzles in a manifold having an outlet for directing the heated air onto the tape.

35. The method of claim 19, further comprising vacuuming debris from a vicinity of at least one impingement point.

36. The method of claim 19, in which directing carbon dioxide from a nozzle occurs non-continuously while still providing continuous reducing of condensation on the tape from a combined operation of more than one nozzle.

\* \* \* \* \*